United States Patent [19]

Murakami

[11] Patent Number: 4,918,461

[45] Date of Patent: Apr. 17, 1990

[54] INK FILM RECORDING APPARATUS

[75] Inventor: Shogo Murakami, Tokyo, Japan

[73] Assignee: Kabushiki Kaisha Toshiba, Kanagawa, Japan

[21] Appl. No.: 344,670

[22] Filed: Apr. 28, 1989

[30] Foreign Application Priority Data

Jun. 14, 1988 [JP] Japan ............................ 63-78615[U]

[51] Int. Cl.$^4$ ............................................ G01D 15/10

[52] U.S. Cl. ............................... 366/76 PH; 400/120; 400/621.1; 400/642; 271/900

[58] Field of Search .................... 346/76 PH; 400/120, 400/642, 621.1; 271/900

[56] References Cited

U.S. PATENT DOCUMENTS 4,660,053 4/1987 Tsutsumi et al. .............. 346/76 PH 4,717,270 1/1988 Tsutsumi ........................ 346/76 PH

OTHER PUBLICATIONS

Battison et al., "Sheet Removal From a Drum", IBM Bulletin, vol. 20, No. 4, 09/77.

*Primary Examiner*—Bruce A. Reynolds
*Assistant Examiner*—Huan Tran
*Attorney, Agent, or Firm*—Banner, Birch, McKie & Beckett

[57] ABSTRACT

A recording apparatus is provided which is capable of transferring recording information from an ink film to recording paper without clogging the recording paper in the recording apparatus. The recording apparatus includes a thermal recording head which generates heat in response to recording information to transfer ink from an ink film to the recording paper thereby printing the recording information on the recording paper. An ink film guide roller guides the ink film from the thermal recording head without forming wrinkles in the ink film. A separating plate is positioned closely adjacent the ink film guide roller to separate the recording paper from the ink film. The ink film guide roller has a pair of side rollers and a center roller, the diameters of the side rollers being greater than the diameter of the center roller in order to reduce the formation of wrinkles in the ink film. Most importantly, the separating plate includes a separating edge having a central portion adjacentg the center roller and two side portions adjacent the side rollers, the central and side portions of the separating plate being dimensioned to provide substantially the same gap between the center roller and the central portion of the separating plate as between the side rollers and the side portions of the separating plate. Thus, the entire edge of the separating plate can be positioned close to the ink film guide roller to establish a constant narrow gap between the separating edge and the ink film guide roller.

15 Claims, 2 Drawing Sheets

INK FILM RECORDING APPARATUS

BACKGROUND OF THE INVENTION

1. Field Of The Invention

The present invention relates to a recording apparatus such as a facsimile receiver and, more particularly, to a recording apparatus for recording information on a recording medium by applying ink to selected portions of the recording medium from an ink film.

2. Description Of The Prior Art

Several methods for printing information on recording paper are well known in the art. Some examples include ink-jet printing, laser-beam printing, and thermal transfer printing. Since the recording apparatus for carrying out thermal transfer printing generally is smaller in size than other recording apparatus, a thermal transfer recording apparatus often is used as a facsimile apparatus. Typical thermal transfer recording apparatus are described in U.S. Pat. No. 4,660,053 issued on Apr. 21, 1987 and U.S. Pat. No. 4,717,270 issued on Jan. 5, 1988.

A typical thermal transfer recording apparatus is shown in FIGS. 1 and 2. In the typical apparatus, recording paper C is unrolled from a roll of recording paper and transported past thermal recording head E upon rotation of platen roller D. Ink film B is unrolled from an ink film feeding roll and transported past thermal recording head E via a guide roller upon rotation of an ink film take-up roll. Ink film B is transported simultaneously with recording paper C. Ink film B and recording paper C are interposed between thermal recording head E and platen roller D, and ink film B is pressed against thermal recording head E.

Thermal recording head E generates heat in response to recording information from an information signal source. The solid ink in ink film B is fused by the generated heat and transferred to recording paper C. Thus, a thermal transfer recording is carried out.

Recording paper C then is transported to cutter device J through separating plate H and lower guide plate I, and ink film B is transported and rolled round an ink film take-up roll via guide roller G. Separating plate H is positioned closely adjacent guide roller G to separate recording paper C from ink film B. As shown in FIG. 2, guide roller G comprises two sizes of rollers including side rollers G1 and G2 and center roller G3. The diameter of side rollers G1 and G2 is greater than the diameter of center roller G3 to prevent ink film from wrinkling by using wide rollers G1 and G2 to stretch the ink film toward both sides.

As shown in FIG. 2, in the typical thermal recording apparatus, separating edge H' of separating plate H is straight. As a result, gap K3 between center roller G3 and separating plate H is wider than gap K1 and K2 between side rollers G1 and G2 and separating plate H. When the position of separating plate H is adjusted closer to guide roller G to improve the separation of recording paper C and ink film B, gap K3 is not narrowed as much as gaps K1 and K2. Since gap K3 cannot be narrowed as much as gaps K1 and K2, and since recording paper C in the vicinity of gap K3 adheres to ink film B due to the presence of fused ink during the thermal transfer recording operation, recording paper C often clogs gap K3.

SUMMARY OF THE INVENTION

The primary object of the present invention is to provide recording apparatus capable of transferring recording information to a recording medium without clogging of the recording medium in the apparatus.

Another object of the invention is to provide a simple structure in a recording apparatus capable of separating recording paper from an ink film.

According to the present invention, a recording apparatus is provided which is capable of transferring recording information from an ink film to recording paper without occurrence of paper clogging. The recording apparatus includes a thermal recording head which generates heat in response to recording information from an information signal. An ink film and the recording paper are pressed against the thermal recording head, and the heat generated by the thermal recording head transfers ink from the ink film to the recording paper thereby printing information on the recording paper. An ink film guide roller is positioned downstream from the thermal recording head to guide the ink film from the thermal recording head without forming wrinkles in the ink film. A separating plate is positioned closely adjacent the ink film guide roller to separate the recording paper from the ink film. The ink film guide roller has a pair of side rollers and a center roller, the diameter of the side rollers being greater than the diameter of the center roller in order to reduce the formation of wrinkles in the ink film. Most importantly, the separating plate includes a separating edge having a central portion adjacent the center roller and two side portions adjacent the side rollers, the central and side portions of the separating plate being dimensioned to provide substantially the same gap between the center roller and the central portion of the separating plate as between the side rollers and the side portions of the separating plate. Thus, the entire edge of the separating plate can be positioned close to the ink film guide roller to establish a constant narrow gap between the separating edge and the ink film guide roller.

As evident from the above description, after the thermal recording transfer operation takes place, the recording paper and ink film are moved forward between the separating plate and the ink film guide roller. The separating plate precisely separates the recording paper from the ink film because there is a constant narrow gap between the separating plate and the ink film guide roller. Thereafter, the recording paper is transported to a cutter device for removal of a sheet of paper with information recorded thereon.

DETAILED DESCRIPTION OF THE PREFERRED EMBODIMENTS

Figure 1:
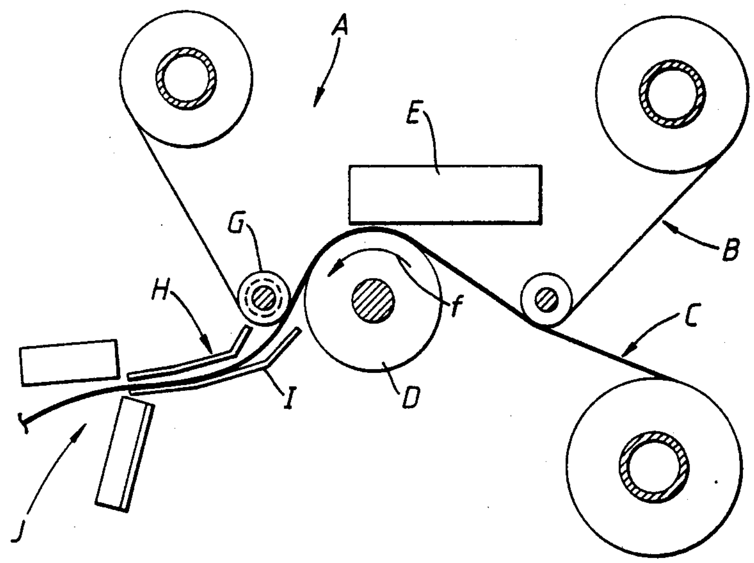
Fig.1. PRIOR ART
FIG. 1 is a block diagram showing a typical conventional thermal transfer recording apparatus.
Figure 2:
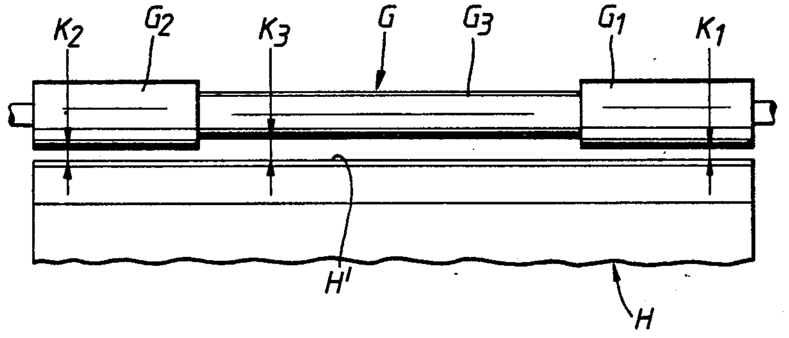
Fig.2. PRIOR ART
FIG. 2 is a magnified view of a separating plate for the apparatus of FIG. 1.
Figure 3:
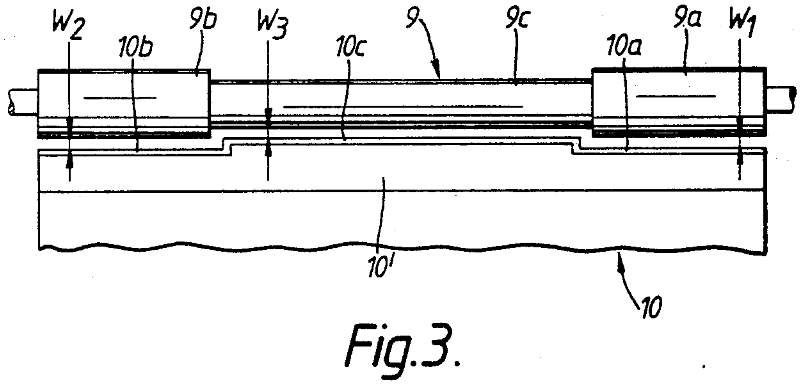
FIG. 3 is a magnified view of a preferred embodiment of a separating plate for a recording apparatus according to the present invention.
Figure 4:
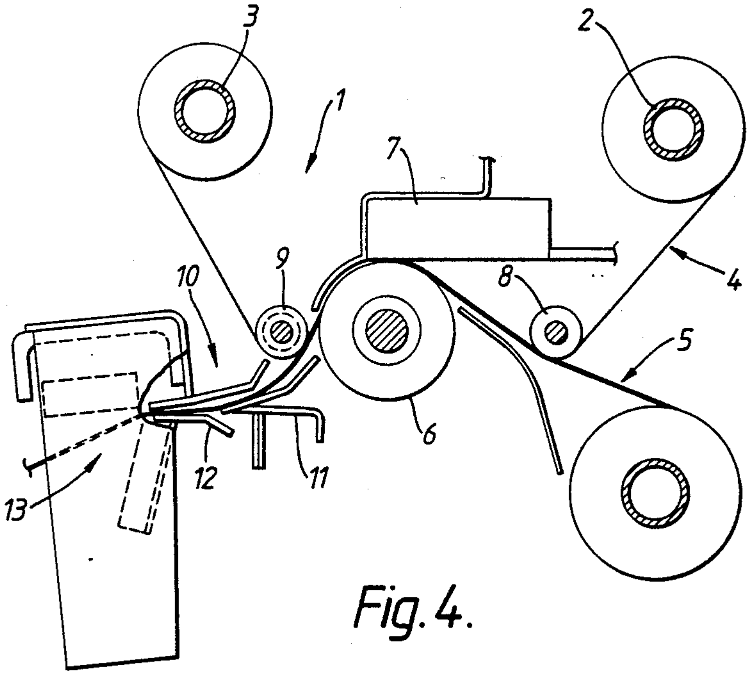
FIG. 4 is a block diagram showing the preferred embodiment of the recording apparatus of the present invention including the separating plate shown in FIG. 3.

A preferred embodiment of the present invention is shown in FIGS. 3 and 4 and includes a casing having a cover frame and bottom frame. For illustrative purposes only, the invention is described as a facsimile receiver. As shown in FIG. 4, ink film cassette 1 including ink film feeding roller 2, ink film take-up roll 3 and thermosensitive ink film 4, thermal recording head 7, guide roller 8 and ink film guide roller 9 are disposed in the cover frame. Recording paper 5, platen roller 6, separating plate 10, lower guide plates 11 and 12 and rotary cutter 13 are disposed in the bottom frame.

Although not shown in the drawings, the cover frame is hinged to the bottom frame, and recording head 7 is brought into contact with platen roller 6 by springs when the cover frame is closed. Recording paper 5 unrolled from a roll of paper and ink film 4 unrolled from ink film feeding roll 2 are held between platen roller 6 and recording head 7. When the cover frame is opened (turned in a clockwise direction), platen roller 6 and recording paper 5 will not turn. When the cover frame is closed, recording paper 5 is transported upon rotation of platen roller 6 by a stepping motor (not shown). Ink film 4 is transported simultaneously with recording paper 5 upon rotation of ink film take-up roll 3 by a stepping motor. The transporting speeds of ink film 4 and recording paper 5 are equal.

Recording head 7 includes a line of heat generating elements driven by recording signals, each bit of which drives one of the heat generating elements. The heat generating elements generate sufficient heat to cause thermosensitive ink film 4 in contact therewith to fuse the solid ink in ink film 4 thereby transferring information to recording paper 5 which is in contact with ink film 4. After transferring information to recording paper 5, ink film 4 is transported and rolled through ink film guide roller 9 positioned near platen roller 6 by the rotation of ink film take-up roll 3. Recorded paper 5 is transported to rotary cutter 13 through separating plate 10 and guide plates 11 and 12. Rotary cutter 13 includes a rotary upper blade and a stationary lower blade. Recording paper 5 is positioned between the blades and is cut by downwardly turning the rotary upper blade.

As best shown in FIG. 3, ink film guide roller 9 has plastic side rollers **9*a* and 9*b* fixed on opposite ends of a metallic shaft by an adhesive member and center roller 9*c* located between plastic side rollers 9*a* and 9*b*. Center roller 9*c* is a metallic roller which may be formed as part of the shaft. Rollers 9*a*, 9*b* and 9*c* have smooth surfaces to reduce the coefficient of friction between these rollers and ink film 4. Ink film guide roller 9 is fixed on the cover frame in a non-rotating position so that ink film 4 slides on the smooth surfaces of the rollers. The diameter of side rollers 9*a* and 9 *b* is greater than the diameter of center roller 9 *c* to prevent transported ink film 4 from wrinkling by stretching ink film 4 toward both sides due to the contact force of side rollers 9*a* and 9 *b***.

Separating plate 10 is an L-shaped metallic plate. The rear side of separating plate 10 is located near the blades of rotary cutter 13 to guide recording paper 5 between the blades of rotary cutter 13. As shown in FIG. 3, separating edge 10' of separating plate 10 adjacent ink film guide roller 9 has a shape which is complementary to the cross-sectional shape of ink film guide roller 9. Separating edge 10' has a stepped configuration with the central step of the separating edge of the separating plate extending toward center roller **9*c* so that the gap between separating edge 10' of separating plate 10 and ink film guide roller 9 remains substantially the same along the separating edge. Namely, the central step of separating edge 10' extends beyond both side steps. The position of the central step corresponds to center roller 9*c* and the position of the side steps corresponds to side rollers 9*a* and 9*b*, respectively. Separating plate 10 is positioned close to ink film guide roller 9 to precisely separate transported recording paper 5 and transported ink film 4 when the cover frame is closed. Additionally, separating edge 10' is perpendicular to the tangent of ink film guide roller 9 at the point nearest separating edge 10'**.

Gaps W1 and W2 between side roller **9*a* and 9*b* and separating edge 10' are substantially equal to gap W3 between center roller 9*c* and separating edge 10'. Gaps W1, W2 and W3 are in the range of 0.6 mm to about 1.0 mm in this embodiment. Since the thickness of recording paper 4 is about 0.06 mm through 0.09 mm and the thickness of the ink film in under 0.02 mm, ink film 4 easily passes through gaps W1, W2 and W3. Thus, a constant narrow gap between separating edge 10' and ink film guide roller 9** is established.

Lower guide plates 11 and 12 are positioned under separating plate 10 for guiding recording paper 5 to rotary cutter 13. The forward end of guide plate 11 is positioned close to platen roller 6 to establish a gap of about 1.00 mm between guide plate 11 and platen roller 6.

The operation of the facsimile receiver will now be described. In an initial or waiting state, after the last cutting operation, the forward or leading edge of recording paper 5 is positioned between separating plate 10 and guide plate 11. When the facsimile receiver receives control signals and information signals from a facsimile transmitter, the receiver decodes and demodulates the information signals to produce recording signals. The control circuit used to perform these operations and the operations described below is well known and is not described herein. In response to the recording signals, the control circuit causes platen roller 6 and ink film take-up roll 3 to rotate for a predetermined period in order to move recording paper 5 and ink film 4 back toward recording head 7 so that the portion of the recording paper and the ink film which previously passed over recording head 7 are not wasted. The recording operation then is carried out.

As each line of recording signals is supplied to recording head 7, platen roller 6 and ink film take-up roll 3 simultaneously rotate in synchronism with receipt and processing of each line. Thus, after the recording operation is initiated, recording paper 5 and ink film 4 are transported step by step. When the forward end of recording paper 5 is transported to separating plate 10, recording paper 5 is separated from ink film 4. Even if recording paper 5 is in contact with ink film 4 due to the adhesion of the fused ink during the transfer operation, separating plate 10 separates them because gaps W1, W2 and W3 between separating plate 10 and ink film guide roller 9 are narrow. By preventing recording paper 5 from entering gaps W1, W2 and W3, paper clogging in gaps W1, W2 and W3 does not occur. Additionally, since recording paper 5 contacts metallic separating plate 10 during the separation of recording paper 5 and ink film 4, the static electricity on recording paper 5 is transmitted to the bottom frame through metallic separating plate 10. Recording paper 5 is transported through rotary cutter 13 during the recording operation and ink film 4 is separately transported to take-up roll 3 as it slides along the surface of ink film guide roller to take-up roll 3.

When the control circuit determines that one page of recording information has been received and recorded on the recording paper, recording signals are no longer supplied to recording head 7. However, platen roller 6 and ink film take-up roll 3 continue to rotate for a predetermined period so that the desired cutting point of recording paper 5 moves to the cutting position of cutter 13. Recording paper 5 then is cut at the cutting point and the cut off section of recording paper 5 is discharged into a tray.

If additional recording signals are received, the forward end of recording paper 5 moves backward to the recording operation starting position together with ink film 4, and a new recording operation is carried out. On the other hand, if additional recording signals are not received, the forward end of recording paper 5 moves backward to a position between separating plate 10 and guide plate 11 since it is not desirable to leave the recording paper immediately adjacent cutter 13 while waiting for the next recording operation. If recording paper 5 is left adjacent cutter 13, cutter 13 may become clogged due to the build up of short strips of paper caused by incorrect actuation of cutter 13.

As previously discussed, since separating edge 10' is positioned immediately adjacent ink film guide roller 9, recording paper is not inserted between separating plate 19 and ink film guide roller 9. As a result, paper clogging between separating plate 10 and ink film guide roller 9 does not occur.

Figure 5:
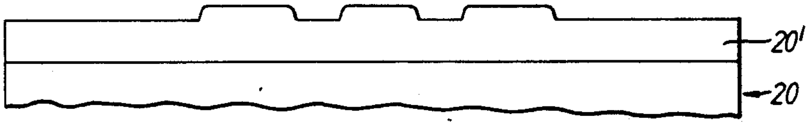
FIG. 5 is a magnified view of another embodiment of a separating plate for a recording apparatus according to the present invention.

The shape of separating plate 10 may be varied as depicted by the alternative embodiment shown in FIG. 5. In FIG. 5, separating plate 20 has a comb-shaped separating edge 20'. Also, according to the above-described embodiment, ink film guide roller 9 is fixed, i.e., does not rotate. However, ink film guide roller 9 may be a free roller and it may be rotatably supported to rotate while ink film 4 is transported from roll 2 to take-up roll 3 past recording head 7 and ink film guide roller. Further, according to the above-described embodiment, ink film guide roller 9 is cylindrical. However, in the event that the ink film guide is non-rotating, the ink film guide need not be cylindrical, but may be any structure having a smooth surface in contact with ink film 4, provided that the stepped configuration described above is maintained.

Various changes in the form, details, proportions and arrangement of parts may be made in the present invention without departing from the spirit or scope of the invention. No undue limitations are to be inferred or implied from the foregoing disclosure.

I claim:

1. A recording apparatus for recording information on a recording medium by applying ink to selected portions of the recording medium from an ink film, said recording apparatus comprising:

recording head means in contact with the ink film for transferring ink from the ink film to selected portions of the recording medium;

transport means for transporting the ink film and the recording medium together along a path adjacent said recording head means; and ink film separating means for separating the ink film from the recording medium after said recording head means transfers ink to the recording medium, said ink film separating means comprising roller means for guiding the ink film away from the recording medium without causing wrinkles in the ink film and a separating plate adjacent said roller means, said roller means comprising a pair of side rollers and a center roller extending between said side rollers, said side rollers having a diameter larger than the diameter of said center roller, said separating plate having a separating edge spaced from said side and center rollers at a distance selected to enable said separating plate to separate the ink film and the recording medium, said separating edge having a configuration complementary to the configuration of said side and center rollers.

2. A recording apparatus according to claim 1 wherein said separating edge has a central portion and two side portions, said central portion having a width corresponding to the width of said center roller and extending from said two side portions toward said center roller to provide a gap between said center roller and said central portion substantially equal to the gap between said side rollers and said side portions.

3. A recording apparatus according to claim 2 wherein said central portion of said separating edge is comb-shaped.

4. A recording apparatus according to claim 1 further comprising cutting means for cutting off the recording medium after said recording head means transfers ink to the recording medium; and said separating plate being located between said recording head means and said cutting means to guide the recording medium to said cutting means.

5. A recording apparatus according to claim 1 wherein said side and center rollers have a common axis.

6. A recording apparatus according to claim 5 wherein said side and center rollers rotate freely with respect to the common axis.

7. A recording apparatus according to claim 5 wherein said side and center rollers are fixed on the common axis.

8. A recording apparatus according to claim 6 wherein said side and center rollers have smooth surfaces to reduce the coefficient of friction.

9. A recording apparatus according to claim 1 wherein said separating plate is a metallic plate to reduce the static electricity on the recording medium.

10. A recording apparatus according to claim 1 wherein the thickness of the ink film is approximately 0.02 mm, the thickness of the recording medium is in the range of approximately 0.06 mm through 0.09 mm and the distance between the separating edge of said separating plate and said side and center rollers is in the range of approximately 0.06 mm through 1.00 mm.

11. A recording apparatus according to claim 1 wherein said separating plate is an L-shaped plate.

12. A recording apparatus according to claim 1 further comprising an ink film cassette which supplies the ink film and which comprises an ink film feeding roll and an ink film take-up roll rotatably mounted therein.

13. A recording apparatus according to claim 1 wherein the ink film and recording medium are simultaneously transported.

14. A recording apparatus for recording information on a recording medium by applying ink to selected portions of the recording medium from an ink film, said recording apparatus comprising:

recording head means in contact with the ink film for transferring ink from the ink film to selected portions of the recording medium;

transport means for transporting the ink film and the recording medium together along a transport path adjacent said recording head means; and ink film separating means for separating the ink film from the recording medium after said recording head means transfers ink to the recording medium, said ink film separating means comprising guide means for guiding the ink film away from the recording medium without causing wrinkles in the ink film and a separating plate adjacent said guide means, said guide means comprising a pair of side guide elements and a central guide element extending between said side guide elements, said side guide elements extending a greater distance toward the transport path than said central guide element, said separating plate having a separating edge spaced from said side and central guide elements at a distance selected to enable said separating plate to separate the ink film and the recording medium, said separating edge having a configuration complementary to the configuration of said side and central guide elements.

15. In a recording apparatus for recording information on a recording medium by applying ink to selected portions of the recording medium from an ink film, said recording apparatus including transport means for transporting the ink film and the recording medium together along a recording path, ink film separating means for separating the ink film from the recording medium after ink from the ink film is applied to selected portions of the recording medium, said ink film separating means comprising:

guide means for guiding the ink film away from the recording medium without causing wrinkles in the ink film; and a separating plate adjacent said guide means, said guide means having a stepped configuration with the sides of said guide means stepped up from the central portion of said guide means toward the recording path, said separating plate having a separating edge spaced from said guide means at a distance selected to enable said separating plate to separate the ink film from the recording medium, said separating edge having a stepped configuration complementary to the stepped configuration of said guide means.

* * * * *